United States Patent [19]

Terry

[11] 4,345,616

[45] Aug. 24, 1982

[54] RETRACTOR FOR HOSE-CONNECTED HAND PIECES

[76] Inventor: Paul V. Terry, P.O. Box 454, Tualatin, Oreg. 97062

[21] Appl. No.: 234,828

[22] Filed: Feb. 17, 1981

Related U.S. Application Data

[63] Continuation-in-part of Ser. No. 130,707, Mar. 17, 1980, abandoned.

[51] Int. Cl.³ .............................................. A61C 19/00

[52] U.S. Cl. .......................... 137/355.17; 137/355.18; 137/355.23; 433/78

[58] Field of Search ...................... 137/355.17, 355.18, 137/355.23, 355.24, 355.25; 433/77, 78

[56] References Cited

U.S. PATENT DOCUMENTS 3,740,852 6/1973 Holmqvist ........................ 433/77 X
3,742,606 7/1973 Fleer et al. ............................ 433/78
3,754,564 8/1973 Naumburg et al. ................ 137/360

*Primary Examiner*—Gerald A. Michalsky
*Attorney, Agent, or Firm*—Eugene M. Eckelman

[57] ABSTRACT

An elongated arm has a base end rotatably mounted on a spindle and such arm supports a hose for a hand piece in an arrangement whereby the hand piece and hose are movable between an extended use position and an automatically retracted non-use position. The arm is associated with a spring which is tensioned upon movement of the hand piece and hose to the use position, whereby it will provide such automatic return. An adjusting knob is connected to the spring to control its tension. The arm is arranged to be installed within an unused passageway portion of the hose to provide the necessary support for the hose intermediate its ends. The tip end of the arm carries a spring extension to prevent kinking of the hose.

6 Claims, 8 Drawing Figures

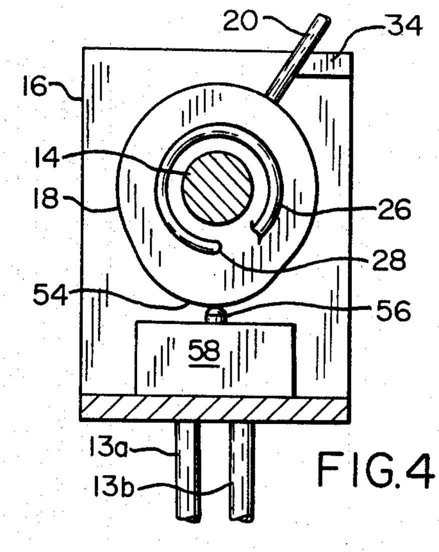
FIG. 4
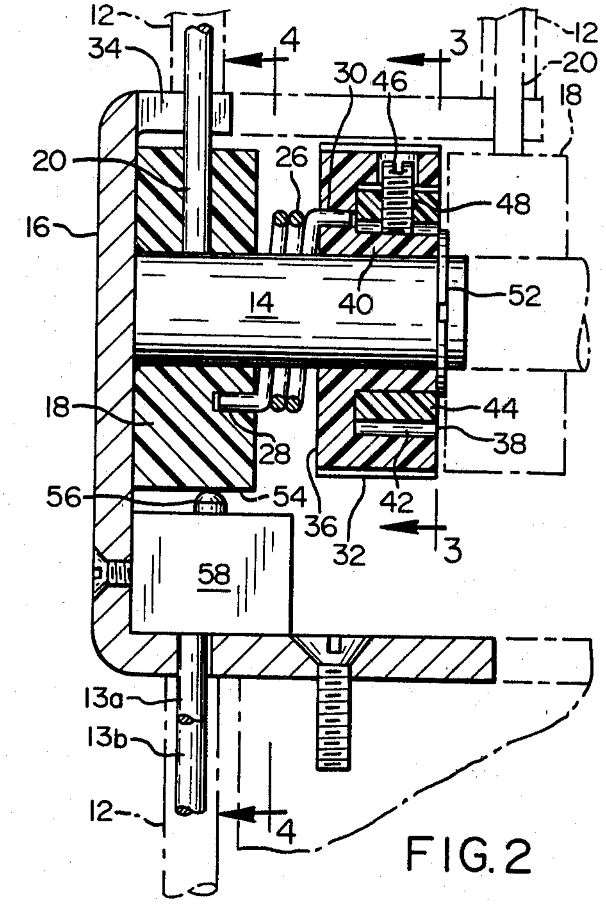
FIG. 2
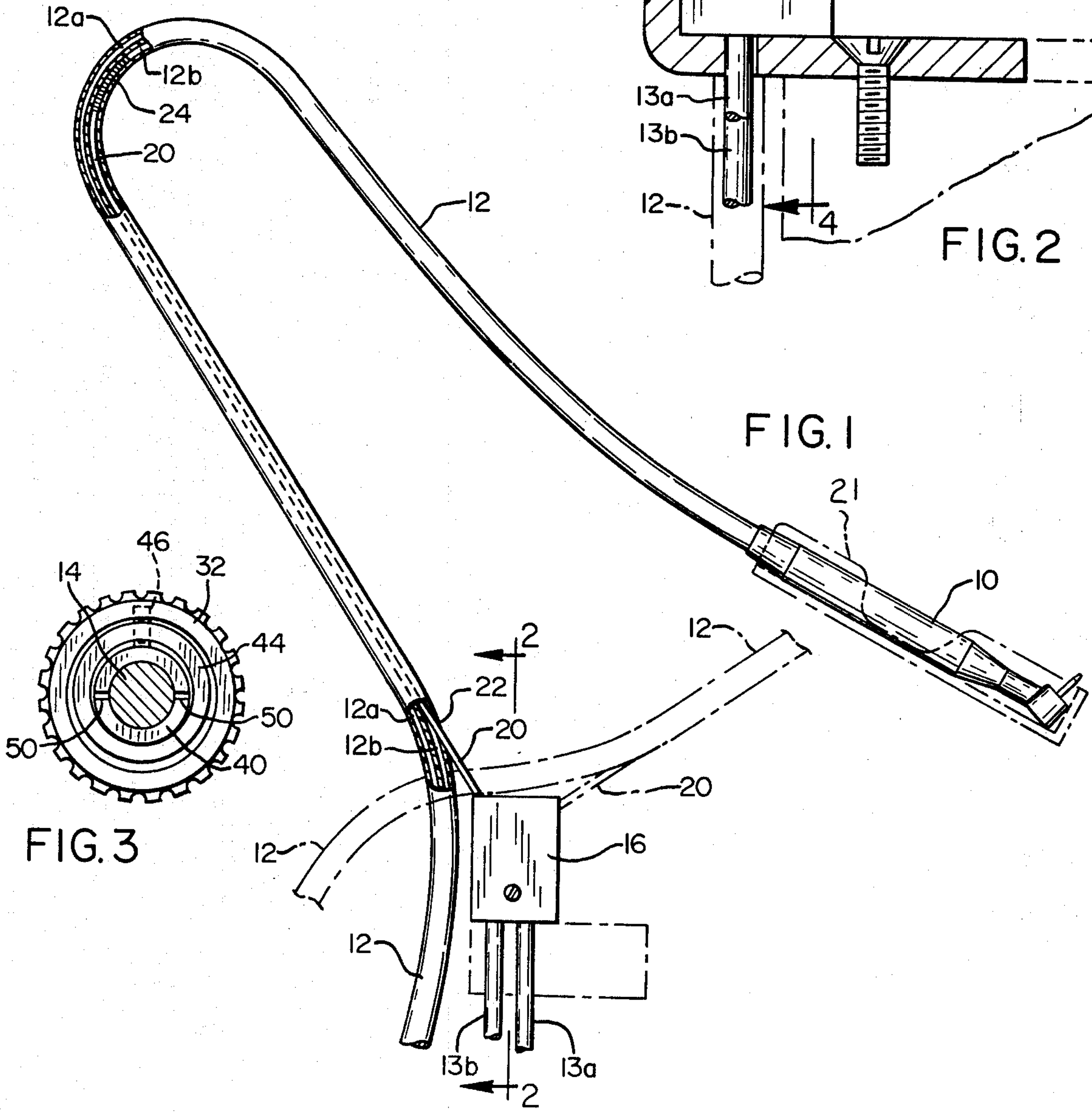
FIG. 1
FIG. 3

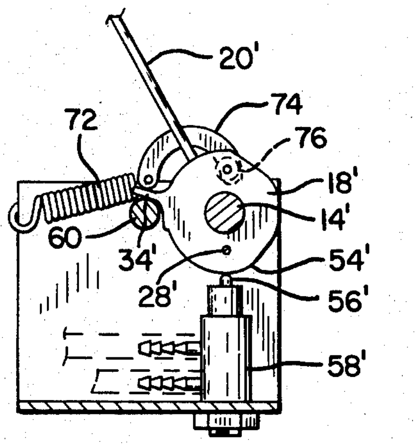
FIG. 8
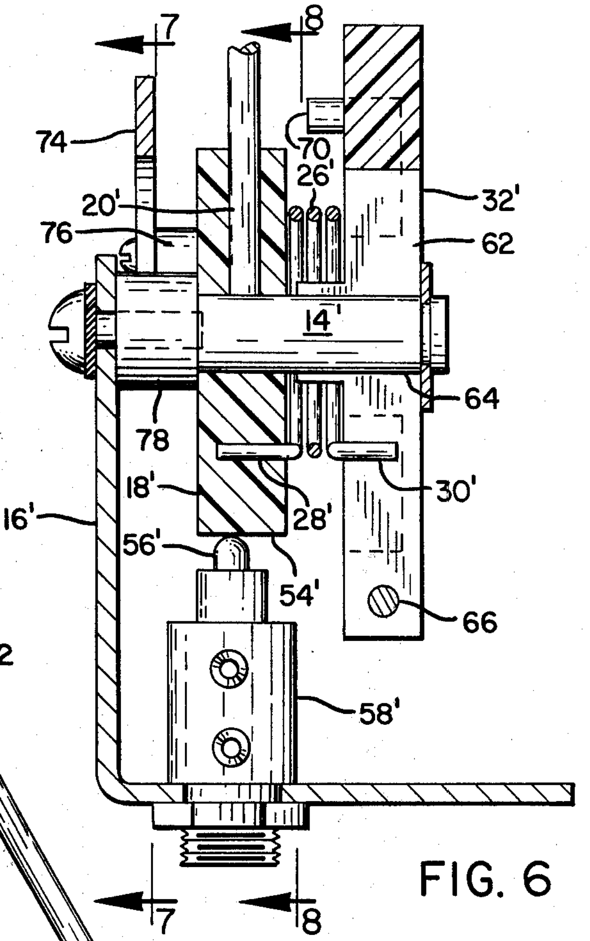
FIG. 6
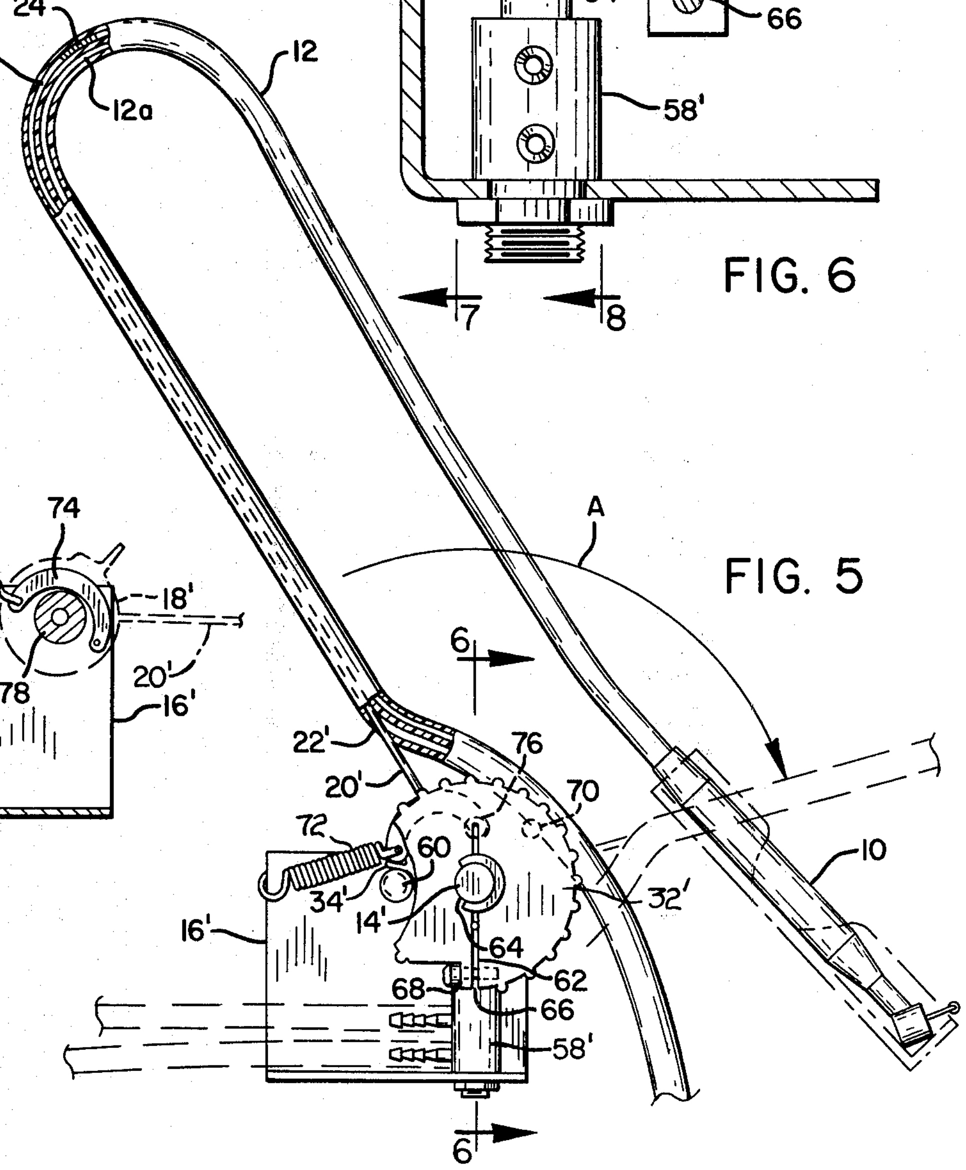
FIG. 5
FIG. 7
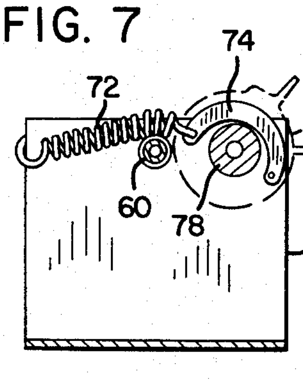

RETRACTOR FOR HOSE-CONNECTED HAND PIECES

CROSS REFERENCE TO RELATED APPLICATIONS

This is a continuation in part of application Ser. No. 130,707, filed Mar. 17, 1980, now abandoned.

BACKGROUND OF THE INVENTION

This invention relates to new and useful improvements in retractors for hose-connected hand pieces.

Various types of retraction systems for dental hand pieces or the like have heretofore been provided. Some of these systems include moving pulleys with springs or weights. Other systems make use of coiled tubes or the like which allow the hand piece and a connecting hose portion thereof to be moved over to a use position but which automatically retract when the hand piece is replaced in its holder. Such prior systems are rather complex in their construction and operation and are relatively expensive to manufacture. They also require a substantial amount of energy by the operator to move them and hold them in a use position.

SUMMARY OF THE INVENTION

According to the present invention and forming a primary objective thereof, a retractor for hose-connected hand pieces is provided which is substantially improved over prior devices in that it has the combined features of being simplified in construction and operation, almost effortless to use, inexpensive to manufacture, and readily adaptable to existing hand piece structures and hose assemblies.

A more particular object of the invention is to provide a retractor for hose-connected hand pieces having a rotatable support for arm means arranged to be connected to an elongated portion of the hose and arranged under spring tension to be moved with the hand piece and hose to a use position but to return the arm and hose assembly upon moving the hand piece to its holder.

Another object is to provide a retractor of the type described having a structural arrangement wherein a major portion of the weight of the hose for the hand piece is supported by the retracting mechanism when the hand piece is in use so that use of the hand piece is with minimum fatigue and can be more precise.

Yet another object is to provide a retractor of the type described having spring return but in its use position having reduced return tension so as to require little or no holding force by the operator in such use position.

A further object is to provide tension adjustment means for the spring to adjust the spring force acting on the assembly.

The structure for carrying out the objectives of the invention comprises an arm having a base end rotatably supported on a holder for movement between an extended use position of the assembly and a retracted non-use position. Means are arranged to connect a hose between its ends to said arm, and return spring means are connected between said arm and said holder. Such return spring means are tensioned upon rotation of the assembly to the use position of the hand piece whereby to automatically retract the hose and its support arm upon return of the hand piece to the nonuse position by the operator. The spring return means may have reduced return tension in the use position of the hand piece to eliminate any substantial retracting force during use. Tension control means are provided for the spring to vary the spring force acting on the assembly. The arm has an elongated connecton to the hose, namely, it can be connected at spaced points along the hose preferably by inserting it in an unused passageway of a multiple passageway hose.

The invention will be better understood and additional objects and advantages will become apparent from the following description taken in connection with the accompanying drawings.

BRIEF DESCRIPTON OF THE DRAWINGS

FIG. 1 is a side elevational view of a retractor for hose-connected hand pieces embodying a first form of the present invention;

FIG. 2 is an enlarged fragmentary sectional view taken on the line 2—2 of FIG. 1;

FIG. 3 is a sectional view in reduced scale taken on the line 3—3 of FIG. 2;

FIG. 4 is a sectional view in reduced scale taken on the line 4—4 of FIG. 2;

FIG. 5 is a side elevatioal view of a retractor embodying a second form of the invention;

FIG. 6 is an enlarged fragmentary sectional view taken on the line 6—6 of FIG. 5;

FIG. 7 is a reduced sectional view taken on the line 7—7 of FIG. 6; and FIG. 8 is a reduced sectional view taken on the line 8—8 of FIG. 6.

DETAILED DESCRIPTION OF PREFERRED EMBODIMENTS

With particular reference to the drawings, and first to FIGS. 1-4, the numeral 10 designates a conventional hand piece, such as a dental hand piece, and the numeral 12 designates a supply hose therefor. The present holder is arranged to normally hold the hand piece and hose in the non-use or retracted position shown in full lines in FIG. 1 but to allow the hose to be pulled over to a use position of the hand piece as shown in broken lines. To provide a support for the hose 12, a spindle 14 is integral with a bracket 16 or other suitable base member. Spindle 14 rotatably supports the base end 18 of an arm 20 of a length sufficient such that when connected to the hose it is capable of holding such hose in a retracted non-use position as shown in full lines in FIG. 1. A suitable holder 21, shown in broken lines in FIG. 1, is associated with the hand piece to hold it in its non-use position. The supply end of the hose extends down to a suitable and conventional control block and foot pedal, not shown. The hose has a pre-selected amount of slack therein below its connection with the arm 20 to allow the arm to be pulled over to the use position of the hand piece.

The arm has suitable connection to the hose at spaced points, and in a preferred arrangement, the hose is provided with an extra passageway and the arm extends into and along such passageway. That is, hoses 12 are frequently multiple passageway hoses, and in such case the arm 20 can be installed in an unused one of the passageways. FIG. 1 illustrates a two-passageway hose, the passageway **12*a* comprising a used passageway for the hand piece and the passageway 12*b* comprising either an unused passageway in which the arm 20 can be installed or an extra passageway constructed especially for receiving the arm 20**, the number of passageways depending upon the requirement of the hand piece. It is to be understood however that if a hose does not include an extra passageway, it can be attached at spaced points to the arm, such as by taping, to accomplish the same purpose. In either case, the hand piece is relieved of most of the weight of the hose to facilitate use of the hand piece.

For attaching the arm in an unused passageway of the hose, such hose is merely provided with a small slit 22 into the unused passageway a short distance above the bracket 16, and the arm then inserted endwise into such passageway. The friction existing between the arm and hose holds such hose firmly in place. The tip end of the arm has a coil spring extension 24 which prevents the hose from kinking at the top.

The base end 18 of the arm 20 is spring-loaded so as to return the assembly to its retracted position and such is accomplished by a spiral spring 26 on the spindle 14 having one end 28 anchored to the base end 18 of the arm and having its other end 30 anchored to an adjusting knob 32 supported on the spindle. The spring 26 is arranged such that it is wound up as the hose and hand piece are moved between the non-use and use positions of the hand piece and is of a strength such that upon replacement of the hand piece by the operator into the holder 21 the arm is automatically retracted. A stop 34 is provided on the bracket 16 and is engageable by the arm 20 in the retracted position of the latter to limit the return movement under the action of the spring.

In a preferred construction of the adjusting knob 32, it is cup-shaped, having one closed end 36 and an opposite open end 38. It has an inner annular flange portion 40 providing rotatable bearing support on the spindle 14 and forming a pocket 42 for a rigid annular sleeve 44 such as a metal band. A radially extending adjusting screw 46 extends freely through the outer defining wall of adjusting knob 32 and has a threaded connection in a tapped bore 48 in the sleeve 44. The bore 48 extends fully through the wall of sleeve 44 and the end of the screw 46 is arranged to bear against an outer surface of the annular flange portion 40 whereby upon selected threaded positioning of the screw 46 the knob 32 can be anchored in selected rotated positions on the spindle to provide the desired tension in the return spring 26. Also by a selected positioning of the adjusting screw 46, the collar 32 can have a frictional grip on the spindle 14 such that even though it is anchored non-rotatably relative to rotation of the arm 20, it can nevertheless be adjusted by hand. Knob 32 thus serves as an adjustment to vary the force of spring 26. The flange 40 has a pair of diametrically located slots 50, FIG. 3, spaced 90 degrees around the screw 46 and extending from the open edge of the knob to the wall 36, these slots allowing the flange to be contracted for frictionally gripping the spindle.

A spring retaining washer 52 is secured on the spindle 14 outward of knob 32 to positively hold the latter in place.

It is usually desired that the supply to the hose 12 be shut off in its retracted position but that the supply be on in the use position, and for this purpose, the base end 18 of the arm has a cam 54 on its exterior surface selectively arranged to operate a plunger 56 or the like of a shut-off valve 58 mounted on the base member and arranged to deactivate the supply to hose 12 when the latter is in its retracted position. This valve has an inlet line 13*a* and an outlet line 13*b* which are associated with the control block and foot pedal previously mentioned in connection with the supply end of the hose 12. Additional arm assemblies may be provided on the holder 16 for multiple hand pieces, it merely being necessary as shown in broken lines in FIG. 2 to extend the length of spindle 14 to hold such assemblies.

With reference to FIGS. 5–8, a second embodiment is provided for accomplishing the same purpose as heretofore described. In this embodiment, a spindle 14' likewise is integral with a bracket 16' and rotatably supports the base end 18' of an arm 20'. Arm 20' has the same connection to and support for a hose 12 having passageways 12*a* and 12*b*, namely, it is arranged to project through a slit 22' into an unused passageway 12*b* in the hose and extend along such passageway to hold the hose upright. The tip end of the arm similarly has a coil spring extension 24' to prevent the hose from kinking.

The base end 18' of the arm is spring loaded by means of a spiral spring 26' on the spindle 14' and having one end 28' thereof anchored to the base end 18' and its other end 30' anchored to an adjusting knob 32' frictionally supported on the spindle in selected set positions. The spring 26' is wound up as the hose is moved to a use position of the hand piece, namely in the direction of arrow A and shown in broken lines in FIG. 5. A stop projection 34' in this embodiment projects from the base member 18' and is arranged to have engagement with a post 60 on the bracket 16' in the retracted position of the hose and arm to limit spring return movement of said hose and arm preferably to a position shown in full lines in FIG. 5.

In the embodiment of FIGS. 5–8, adjusting knob 32' has a friction fit on spindle 14' by means of diametral slot 62 leading in from the periphery and intersecting an axial bore 64 that receives the spindle. A clamp screw 66 extends freely through the shoulder 68 of a notch cut in the edge of the knob and extends across the slot and into a threaded engagement with the knob on the other side of the slot 62. By selected adjustment of the clamp screw, the knob is stationary on the spindle during rotation of the arm 20' but at the same time it can be forcefully adjusted by hand to vary the tension of the spring.

Adjusting knob 32' has a lateral stop projection 70 arranged for engagement with the post 60 in a position in which the spring is fully wound, thus insuring against overwinding of said spring.

Some hand pieces to be associated with the present retractor may be quite heavy and it may be desired in connection with such heavier pieces to provide auxiliary spring return in combination with spiral spring 26'. For this purpose, a tension spring 72 has one end connected to a rear portion of the bracket 16' and the other end is connected to one end of a downturned arcuate link 74. Link 74 has its other end connected pivotally to a projection 76 on one side of base end 18' of the arm 20', the base end 18' being spaced from the bracket 16' by an enlarged end portion 78 of the spindle 14' to allow working of spring 72. Link 74 is arranged so that as it moves forward and downward with the forward rotation of projection 76 on the base end 18', the concavity thereof fits over and down on enlargement 78 as shown in FIG. 7. This allows the spring 72 to work properly in the forward movement of the hose and its supporting arm. The engagement of the link 74 with the spindle portion 78 will also assist the drag of the spring in view of its engagement with the portion 78 to provide a braking force in the forward rotation of the hose and arm.

Also, the spring 72 is anchored on the rear of the bracket 16' in a selected position such that when the hose and arm are in their forwardmost or use position, the pulling force of the spring is aligned substantially straight through the center of the axis of the base end 18', as illustrated by the phantom line position of the base end 18' in FIG. 7, thus losing most of its leverage for pulling the hose and arm back. In such centering position of the spring, there is a minimum of return pulling force on the hose and its holding arm in the use position of the hose.

As the hose and arm are started back, the spring 72 will immediately again pick up its leverage for assisting spring 26' in the retracting movement.

As in the FIG. 1 embodiment, the base end 18' of the arm 20' has a cam 54' arranged to operate the plunger 56' of a shutoff valve 58' on the bracket and arranged to deactivate the supply to hose 12 when the hose and arm are retracted.

It is to be understood that the forms of my invention herein shown and described are to be taken as preferred examples of the same and that various changes in the shape, size and arrangement of parts may be resorted to without departing from the spirit of my invention or the scope of the subjoined claims.

Having thus described my invention, I claim:

1. Retractable apparatus for hand pieces arranged for use with a fluid supply hose of the type having at least one supply passageway and an unused passageway, (a) base member, (b) an arm having opposite ends, (c) and support means on said base member rotatably supporting said arm at one end thereof on said base member, (d) the end of said arm opposite from its support on said base member comprising a tip end arranged to penetrate a hose and extend into the unused passageway of the hose, (e) said arm extending interiorly along a portion of the unused passageway such as to provide an elongated support for the hose between its ends.

2. The apparatus of claim 1 including a spring extension on said arm at the end opposite from its support on said base member to prevent kinking of the hose at said end.

3. The apparatus of claim 1 including return spring means connected between said arm and said base member, said return spring means being tensioned upon movement of said arm from a non-use position of a hose and hand piece to their use position whereby to retract the hose and hand piece upon return thereof to said non-use position.

4. The apparatus of claim 3 including tension control means for said spring to vary the force required to rotate the arm to the use position.

5. Retractable apparatus for hose connected hand pieces comprising (a) a base member, (b) an arm having opposite ends, (c) a spindle on said base member rotatably supporting said arm for movement between non-use and use positions, (d) means arranged to connect a hose intermediate its ends to said arm, (e) a spiral spring on said spindle having one end connected to said arm, (f) a collar on said spindle secured to the other end of said spring wherein said spring is tensioned upon movement of said arm from its non-use position to its use position whereby to automatically retract the arm upon release thereof, (g) friction means on said collar engageable with said spindle, (h) and adjustment means operative on said friction means arranged to set said friction means on said spindle in a manner to provide a fixed anchor for said other end of said spring in the tensioned operation of said arm but allowing manual rotative repositioning of said collar on said spindle to change the retracting force of said spring.

6. The apparatus of claim 5 including a tension spring connected between said base member and said arm providing an auxiliary retracting force on said arm, and overcentering means on said tension spring releasing retracting forces of the latter in a used position of said arm.

* * * * *